(12) United States Patent
Oswald et al.

(10) Patent No.: US 8,679,639 B2
(45) Date of Patent: Mar. 25, 2014

(54) EXTRUSION COATING COMPOSITION

(75) Inventors: Thomas Oswald, Lake Jackson, TX (US); Wayde V. Konze, Midland, MI (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 755 days.

(21) Appl. No.: 12/608,647

(22) Filed: Nov. 24, 2009

(65) Prior Publication Data

US 2011/0124254 A1 May 26, 2011

(51) Int. Cl.
*B32B 27/32* (2006.01)
(52) U.S. Cl.
USPC .............. 428/523; 524/528; 442/59; 442/327
(58) Field of Classification Search
USPC ................ 442/59, 62, 327; 428/523; 524/528
See application file for complete search history.

(56) References Cited

U.S. PATENT DOCUMENTS

| | | |
|---|---|---|
| 4,486,552 A | 12/1984 | Niemann |
| 4,599,392 A | 7/1986 | McKinney et al. |
| 4,612,300 A | 9/1986 | Coleman, III |
| 5,272,236 A | 12/1993 | Lai et al. |
| 5,278,272 A | 1/1994 | Lai et al. |
| 5,512,693 A | 4/1996 | Rosen et al. |
| 5,582,923 A | 12/1996 | Kale et al. |
| 5,773,155 A | 6/1998 | Kale et al. |
| 5,919,983 A | 7/1999 | Rosen et al. |
| 2007/0112160 A1 * | 5/2007 | Schramm et al. ............. 526/352 |

FOREIGN PATENT DOCUMENTS

| | | |
|---|---|---|
| EP | 0792318 | 9/1997 |
| WO | 9616119 | 5/1996 |
| WO | WO 9806727 | 2/1998 |
| WO | WO 9849212 | 11/1998 |
| WO | WO 2005023912 | 3/2005 |
| WO | 2006096504 | 9/2006 |
| WO | WO 2007136494 | 11/2007 |
| WO | WO 2007136495 | 11/2007 |
| WO | WO 2007136496 | 11/2007 |
| WO | WO 2007136497 | 11/2007 |
| WO | WO 2007136506 | 11/2007 |

OTHER PUBLICATIONS

PCT Search Report for PCT WO2011066469 dated Jun. 3, 2011 for counterpart PCT Application No. PCT/US2010/058114, 2 pages.
IPRP dated Jun. 7, 2012; from corresponding PCT Application No. PCT/US10/058114.
Williams, et al., The construction of a polyethylene calibration curve for gel permeation chromotography using polystyrene fractions. J. Polym. Sci., Polym. Let., 6: 621-624 (1968).
Mourey, T.H., et al., A strategy for interpreting multidetector size-exclusion chromatography data I. Chromatography Polym. Chpt. 12, pp. 180-198 (1992).
Balke, S.T., et al., A strategy for interpreting multidetector size-exclusion chromotography data II, Chromatography Polym. Chpt. 13, pp. 199-219 (1992).
Zimm, B. H., Apparatus and Methods for Measurement and Interpretation of the Angular Variation of Light Scattering; Preliminary Results on Polystyrene Solutions. J.Chem.Phys., 16: 1099-1116 (1948).
Kratochvil, P., Fundamental light-scattering methods. Classical Light Scattering from Polymer Solutions, Elsevier, Oxford, NY (1987).

* cited by examiner

*Primary Examiner* — Lynda Salvatore

(57) ABSTRACT

Multimodal polyethylene compositions are provided. Extrusion compositions including the multimodal polyethylene are provided. The extrusion composition further include a high pressure low density polyethylene and optionally other additives and/or polyethylenes. Extruded articles made from the polyethylene extrusion compositions are also provided.

8 Claims, 5 Drawing Sheets

Process Conditions for Primary Reactor

| IE 1-8 & CE A-B | Solv. kg/hr | C₂H₄ kg/hr | H₂ sccm[a] | C₈H₁₆ kg/hr | T °C | Cat. Conc.[b] mmol/L | Cat. Flow g/hr | Cocat. Conc. mmol/L | Cocat. Flow g/hr | MMAO Conc. mmol/L | MMAO Flow g/hr | C₂H₄ Conv. (%) |
|---|---|---|---|---|---|---|---|---|---|---|---|---|
| 1 | 9.5 | 1.51 | 20.0 | 0.42 | 185 | 0.146 | 20 | 0.146 | 25 | 5.84 | 25 | 90 |
| 2 | 9.3 | 1.24 | 3.0 | 0.93 | 175 | 0.146 | 47 | 0.146 | 57 | 5.84 | 130 | 90 |
| 3 | 12.0 | 1.94 | 15.0 | 0.85 | 185 | 0.146 | 62 | 0.146 | 76 | 5.84 | 100 | 90 |
| 4 | 11.0 | 1.25 | 1.0 | 0.80 | 125 | 0.302 | 85 | 0.302 | 102 | 5.84 | 25 | 90 |
| 5 | 12.0 | 2.00 | 30.0 | 0.70 | 135 | 0.302 | 85 | 0.302 | 100 | 5.84 | 25 | 90 |
| 6 | 11.0 | 1.25 | 2.5 | 1.75 | 135 | 0.227 | 52 | 0.227 | 43 | 5.84 | 35 | 90 |
| 7 | 12.5 | 1.99 | 22.5 | 1.35 | 136 | 0.227 | 31 | 0.227 | 37 | 5.84 | 35 | 90 |
| 8 | 12.0 | 1.65 | 75.0 | 0.53 | 185 | 0.146 | 52 | 0.146 | 62 | 5.84 | 150 | 92 |
| A | 32.0 | 6.09 | 310 | 2.10 | 185 | 0.146 | 70 | 0.146 | 85 | 5.84 | 150 | 89 |
| B | 33.3 | 5.50 | 327 | 1.45 | 135 | 0.302 | 227 | 0.302 | 272 | 5.84 | 50 | 90 |

[a] SCCM = standard cm³/min. [b] Concentrations for Catalyst ("Cat."), Cocatalyst ("Cocat.") and MMAO are listed as mmol/L of the respective metal in the feed solution.

FIG. 1

Process Conditions for the Secondary Reactor

| IE 1-8 & CE A-B | Solv. kg/hr | $C_2H_4$ kg/hr | $H_2$ sccm[a] | $C_8H_{16}$ kg/hr | T °C | Cat. Conc.[b] mmol/L | Cat. Flow g/hr | Cocat. Conc. mmol/L | Cocat Flow g/hr | MMAO Conc. mmol/L | MMAO Flow g/hr | $C_2H_4$ Conv. (%) |
|---|---|---|---|---|---|---|---|---|---|---|---|---|
| 1 | 25.0 | 4.67 | 275 | 6.0 | 185 | 0.2 | - | - | - | - | - | 91 |
| 2 | 27.0 | 4.76 | 120 | 1.3 | 135 | 0.94 | 56 | 0.94 | 67 | 5.84 | 150 | 90 |
| 3 | 25.0 | 4.05 | 135 | 1.25 | 135 | 0.94 | 55 | 0.94 | 66 | 5.84 | 165 | 90 |
| 4 | 27.0 | 4.76 | 125 | 1.2 | 135 | 0.94 | 60 | 0.94 | 138 | 5.84 | 50 | 90 |
| 5 | 25.0 | 4.05 | 160 | 1.15 | 136 | 0.94 | 45 | 0.94 | 54 | 5.84 | 70 | 90 |
| 6 | 27.0 | 4.76 | 205 | 1.3 | 135 | 0.94 | 32 | 0.94 | 38 | 5.84 | 30 | 90 |
| 7 | 25.0 | 4.05 | 425 | 1.75 | 135 | 0.94 | 34 | 0.94 | 40 | 5.84 | 10 | 90 |
| 8 | 27.0 | 4.50 | 90 | 1.60 | 135 | 0.94 | 39 | 0.94 | 47 | 5.84 | 55 | 90 |
| A | NA | NA | NA | NA | NA | NA | NA | NA | NA | NA | NA | NA |
| B | NA | NA | NA | NA | NA | NA | NA | NA | NA | NA | NA | NA |

[a] SCCM = standard cm³/min. [b] Concentrations for Cat., Cocat. and MMAO are listed as mmol/L of the respective metal in the feed solution.

FIG. 2

EXTRUSION COATING COMPOSITION

BACKGROUND OF THE INVENTION

This invention relates to novel multimodal polyethylenes, polyethylene extrusion compositions comprising low density polyethylene and the multimodal polyethylene, and also to extruded articles made from the polyethylene extrusion compositions.

Low density polyethylene (LDPE) made by high-pressure polymerization of ethylene with free-radical initiators as well as high density polyethylene (HDPE), linear low density polyethylene (LLDPE) and ultra low density polyethylene (ULDPE) made by the copolymerization of ethylene α-olefins with Ziegler-Natta and/or single site metallocene catalysts at low to medium pressures have been used, for example: (i) to extrusion coat substrates such as paper board, paper, and/or polymeric substrates; (ii) to prepare extrusion cast film for applications such as disposable diapers and food packaging; and (3) to prepare extrusion profiles such as wire and cable jacketing. Hereinafter, traditional HDPE, LLDPE and ULDPE resins, comprising linear and substantially linear polyethylene resins, are collectively referred to as linear polyethylene. Although LDPE generally exhibits excellent extrusion processability and high extrusion drawdown rates, LDPE extrusion compositions lack sufficient abuse resistance and toughness for many applications.

The density limitations of LDPE resins, approximately 0.915-0.935 g/cc, hinders their use unblended when lower heat seal characteristics are needed, or for higher density applications, such as release paper coating, photographic paper coating where higher modulus is needed. For extrusion coating and extrusion casting purposes, efforts to improve properties by providing LDPE compositions having high molecular weights (i.e., having melt index, $I_2$, less than about 2 g/10 min) are not effective since such compositions inevitably have too much melt strength to be successfully drawn down at high line speeds. While ethylene copolymers with functionalized olefins, such as vinyl acetate, offer lower heat seal temperatures, the chemical properties of such resins make them unsuitable for many uses. No known method to prepare a LDPE with density above about 0.935 has been disclosed. Thus applications requiring such higher densities rely on linear resins, usually blended with LDPE to improve the coating performance, but usually with sacrifice of the desired physical properties.

While HDPE, LLDPE and ULDPE extrusion compositions offer improved abuse resistance, toughness properties and barrier resistance (against, for example, moisture and grease permeation), these linear ethylene polymers cannot be extruded or drawn down at high take-off rates and they are known to exhibit relatively poor extrusion processability in the form of high neck-in, draw resonance and high motor load.

The ultimate extrusion drawdown rate of ethylene α-olefin interpolymers is limited (at otherwise practical extrusion line speeds) by the onset of a melt flow instability phenomena known as draw resonance rather than being limited by melt tension breaks due to "strain hardening" which occurs at higher line speeds and is typical for LDPE and other highly branched high pressure ethylene polymers such as, for example, ethylene-acrylic acid (EAA) copolymers and ethylene vinyl acetate (EVA) copolymers, herein referred to as functionalized LDPE resins.

Linear low density polyethylene (LLDPE) is typically a copolymer of ethylene and an α-olefin of 3 to 12 carbon atoms, preferably 4 to 8 carbon atoms (for example, 1-butene, 1-octene, etc.), that has sufficient α-olefin content to reduce the density of the copolymer to a density of from 0.915 to 0.935 g/cc, the density range available for LDPE. LLDPE resins exhibit improved performance over LDPE in many areas, including improved abuse resistance, toughness properties, sealant properties, range of modulus, barrier resistance (against, for example, moisture and grease permeation). However, in general, linear ethylene polymers exhibit unacceptably high neck-in and draw resonance resulting in relatively poor extrusion processability compared to pure LDPE. Consequently, LLDPE resins are generally considered unacceptable in the extrusion coating industry and are blended with LDPE in commercial applications to improve processability while benefiting from the superior range of physical properties of LLDPE. However, addition of LDPE resins does have some negative impact on the performance properties of LLDPE.

Several compositions containing LDPE blended with linear polyethylene resins have been disclosed. For example, U.S. Pat. No. 5,582,923 discloses compositions with 5% to 20% LDPE, $I_2$<6 g/10 minutes, and linear density 0.85-0.94. Similarly, U.S. Pat. No. 5,773,155 and EP 0792318 disclose substantially linear polyethylene blended with up to 25% LDPE. WO 2005/023912 discloses an extrusion composition containing a minimum of 10% LDPE wherein the substantially linear polyethylene component has a melt index >20 g/10 min. The compositions disclosed in these references can be blended as part of the powder pelletization stage in the gas phase process for manufacturing linear polyethylene resins. However, not all manufacturing installations have such process capability. In general, these compositions cannot be prepared in the solution process for manufacturing linear polyethylene resins prior to pelletization because the capability to feed the required amounts of LDPE is not available or would require unacceptable reduction in reactor rate. Thus, these blends must be made subsequent to pelletization at substantial cost, (e.g., costs related to reheating the polymers and transportation).

Often solution process linear polyethylene plants are designed with the capability to side-arm a quantity of material into the molten polymer flow prior to pelletization. The maximum quantity that may be added by side-arm addition is generally less than 20% of the polymer flow and more often <6% of the polymer flow. This side arm addition capability is generally utilized for addition of various additives to the polymer such as anti-oxidants, slip agents and the like.

Thus, there is a need for linear polyethylene compositions of a wide range of densities, which when blended with LDPE resin, exhibit acceptable coating behavior and wherein the blend comprises <20% LDPE of the total resin weight and preferably <6% LDPE.

Another need arises from the limited availability of autoclave LDPE. Although autoclave LDPE is generally preferred for extrusion coating processes, there is much wider availability of tubular LDPE compared to autoclave LDPE. Tubular LDPE, however, tends to cause the formation of smoke during the extrusion coating process. Moreover, when blended with linear polyethylene, greater amounts of tubular LDPE, compared to autoclave LDPE, are required to attain acceptable processability, e.g., low neck-in and high drawdown rates. The amount of tubular LDPE generally needed to obtain acceptable extrusion processability is at least 25% of the total resin when blended with known linear polyethylene resins. Such large amounts of tubular LDPE cause substantial smoking during extrusion and are often associated with wax build-up on various parts of the extrusion equipment, such as rollers, resulting in undesirable equipment shut-down. To take advantage of the wider availability of tubular polyethylene, it would be desirable to have a linear polyethylene composition that, when blended with less that 25% tubular LDPE by weight of the total resin, exhibits acceptable extrusion processability.

As described hereinafter, the present invention substantially fills the need for ethylene polymer extrusion compositions having high line speeds, high resistance to draw resonance and substantially reduced neck-in, comprising <20% autoclave LDPE of the total resin weight and preferably <6% autoclave LDPE, and a method of making such compositions. Embodiments of the invention further fills the need for ethylene polymer extrusion compositions yielding acceptable extrusion coater performance comprising tubular LDPE comprising 15% to 20% of the total resin composition. The linear polyethylene resin component of embodiments of the present invention comprise a high molecular weight component having substantial long chain branching and a low molecular weight component and is referred to hereinafter as Multimodal polyethylene or Multimodal PE. The compositions of the present invention can be used in conjunction with known resin manufacturing and extrusion coating equipment and equipment modifications and the combined or synergistic benefits of the present invention and known solutions can also be realized.

SUMMARY OF THE INVENTION

Certain embodiments of the invention provide a polyethylene resin characterized by: (a) $M_w(abs)/M_w(RI)>1.05$ and <1.6; (b) $M_z(measured)/M_z(calc)>1.4$ and <3.0 where $M_z(calc)$ is calculated from the measured $I_2$ according to $M_z(calc)=1.5*10^{(5.077-0.284*log\,10(I_2))}$; (c) $I_2>8.0$ g/10 minutes and <15.0 g/10 minutes; (d) CDF(RI fraction)>0.01 at a log $10(M_w)$ of 5.5; and (e) density in the range 0.860-0.965 g/cc.

Other embodiments of the invention provide an extrusion composition including from 80% to 98% Multimodal PE and 2% to 20% LDPE wherein the Multimodal PE is characterized by: (a) $M_w(abs)/M_w(RI)>1.05$ and <1.6; (b) $M_z(measured)/M_z(calc)>1.4$ and <3.0; (c) $I_2>8.0$ g/10 minutes and <15.0 g/10 minutes; (d) CDF(RI fraction)>0.01 at a log $10(M_w)$ of 5.5; and (e) density in the range 0.860-0.965 g/cc; and the LDPE is characterized by having a $I_2$ less than 10 g/10 min and greater than 0.2 g/10 min, and a $M_w(abs)/M_w(RI)>2.0$.

In particular embodiments of the invention, the extrusion composition includes from 91% to 97% Multimodal PE and 3% to 9% LDPE and further wherein the Multimodal PE is characterized by: (a) $M_w(abs)/M_w(RI)>1.10$ and <1.20; (b) $M_z(measured)/M_z(calc)>1.5$ and <2.5; (c) $I_2>9.0$ and <12.0; (d) CDF(RI fraction)>0.02 at a log $10(M_w)$ of 5.5; and (e) MWD>3.0 and <3.5; and the LDPE is characterized by having a $I_2$ less than 1.0 g/10 min and greater than 0.3 g/10 min, and the $M_w(abs)/M_w(RI)$ is >3.2.

Yet other embodiments of the invention provide an article comprising at least one layer of an ethylene polymer extrusion composition, wherein the extrusion composition comprises from 80% to 98% Multimodal PE and 2% to 20% LDPE. In certain aspects of the invention, the ethylene polymer composition is in the form of an extrusion profile, an extrusion coating onto a substrate or an extrusion cast film. In other aspects of the invention, the article is an extrusion coating onto a substrate and the substrate is a woven or non-woven fabric. In yet other aspects, the at least one layer of an ethylene polymer composition is a sealant layer, adhesive layer, abuse resistance layer, or release surface.

DESCRIPTION OF THE DRAWINGS

FIG. 1 is a table containing the operating conditions of the primary reactor used to produce certain embodiments of the invention, namely Inventive Examples ("Inv. Ex." or "IE") 1-8 and Comparative Examples ("Comp. Ex." or "CE") A-B.

FIG. 2 is a table containing the operating conditions of the secondary reactor used to produce certain embodiments of the invention, namely Inventive Examples ("Inv. Ex." or "IE") 1-8. Comparative examples (CE) A-B are single reactor resins and are not represented in FIG. 2.

DESCRIPTION OF THE PREFERRED EMBODIMENTS

1. Definitions

Figure 3:
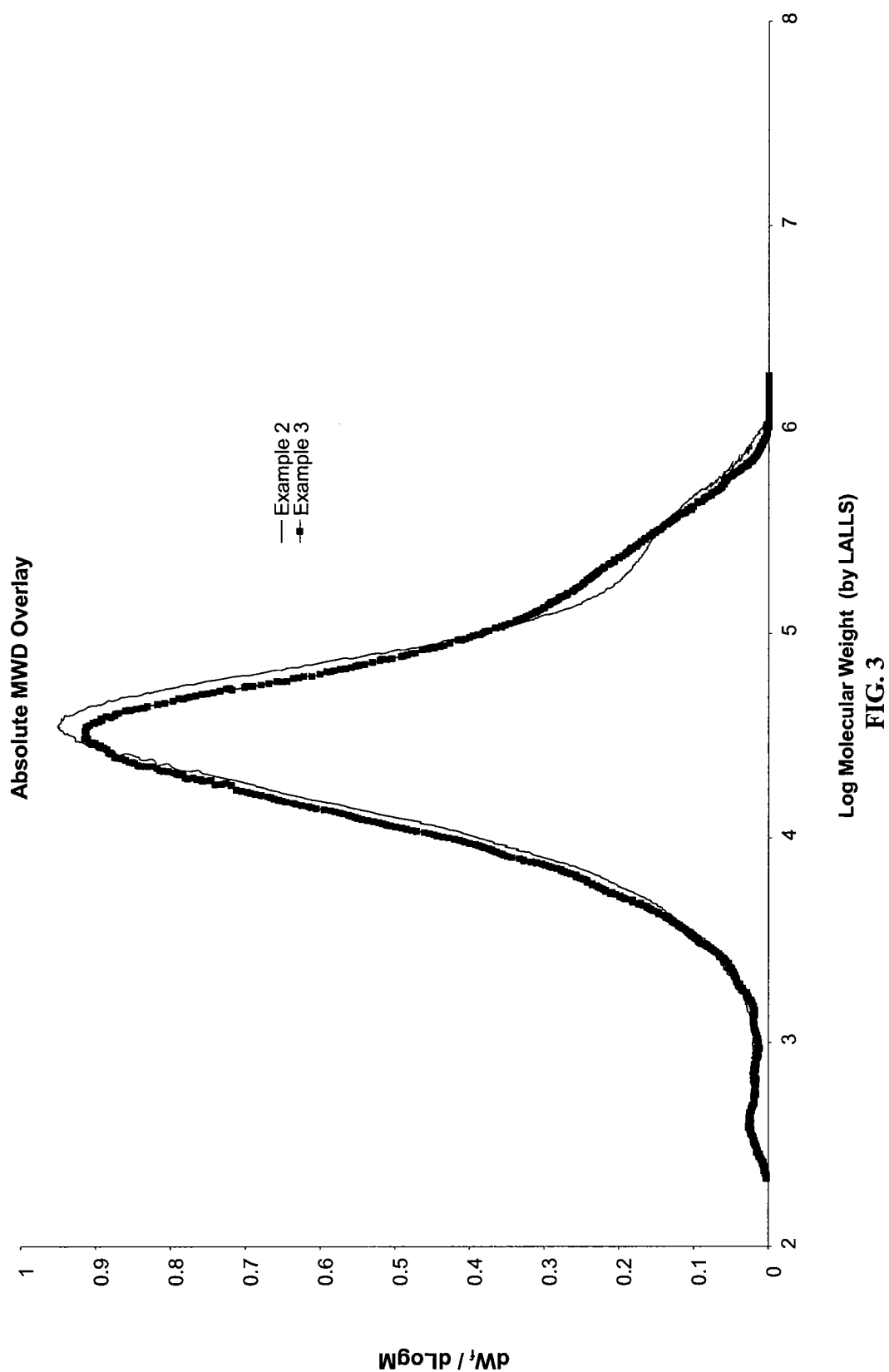
FIG. 3 is a graphical illustration of the molecular weight distribution as measured by GPC evidencing the bi-modal MWD of two Multimodal PEs useful in embodiments of the inventive composition and represent IE 2 & 3 illustrating raw data plotted as "Light Scattering Response (=MW*Concentration) vs. Elution Volume.

The term "haul-off," as used herein, means the speed at which a substrate is moving, thus stretching or elongating a molten polymer extrudate.

The term "neck-in," as used herein, is the difference between the die width and the extrudate width on the fabricated article. The neck-in values reported herein are determined at a haul off rate of 440 feet/minute which yields a 1 mil coating thickness at an extrusion rate of approximately 250 lbs/hr using a 3.5-inch diameter, 30:1 L/D extrusion coater equipped with a 30 inch wide die deckled to 24 inches and having a 25-mil die gap, at a temperature of about 600° F., whereas "Drawdown" is defined as the haul-off speed at which the molten polymer breaks from the die or the speed at which edge instability. Data is also reported at a haul off rate of 880 feet/minute under similar processing conditions which yields a coating thickness of 0.5 mil.

The term "polymer," as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "LDPE," as used herein, may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "functionalized polyethylene" means a polyethylene incorporating at least one functional group in its polymer structure. Exemplary functional groups may include, for example, ethylenically unsaturated mono- and di-functional carboxylic acids, ethylenically unsaturated mono- and di-functional carboxylic acid anyydrides, salts thereof and esters thereof. Such functional groups may be grafted to an ethylene homopolymer or an ethylene-α-olefin interpolymer, or it may be copolymerized with ethylene and an optional additional comonomers to form an interpolymer of ethylene, the functional comonomer and optionally other comonomer(s).

The term "long chain branching" or "LCB," as used herein means a chain length of at least 6 carbons, above which the length cannot be distinguished using $^{13}C$ nuclear magnetic resonance spectroscopy. The long chain branch can be as long as about the same length as the length of the polymer backbone to which it is attached.

The term "molecular weight distribution" or "MWD," as used herein, is defined as the ratio of weight average molecular weight to number average molecular weight ($M_w/M_n$). $M_w$ and $M_n$ are determined according to methods known in the art using conventional GPC.

The ratio $M_w$ (absolute)/$M_w$ (GPC) or "Gr," as used herein, is defined wherein $M_w$ (absolute) is the weight average molecular weight derived from the light scattering area at low angle (such as 15 degrees) and injected mass of polymer and the $M_w$ (GPC) is the weight average molecular weight obtained from GPC calibration. The light scattering detector is calibrated to yield the equivalent weight average molecular weight as the GPC instrument for a linear polyethylene homopolymer standard such as NBS 1475.

2. Description of the Composition

Embodiments of the inventive extrusion composition are blends of one or more multimodal polyethylene resins, each comprising a high molecular weight component with substantial long chain branching and at least one lower molecular weight polyethylene resin, blended with one or more LDPE resins or blends of LDPE and one or more functionalized LDPE resins, optionally with additional polymers, such as minor amounts of polypropylene. Whereas embodiments of the invention may comprise up to 20% LDPE, one preferred embodiment comprises about 90% of at least one Multimodal PE component based on the total weight of the composition. In another preferred embodiment, the composition comprises at least about 94% of the Multimodal PE component, and in a more preferred embodiment the composition comprises 96% of the Multimodal PE component.

Embodiments of the inventive composition also contain from 2% to 20%, preferably from 4% to 10%, based on the total weight of the composition, of at least one LDPE. It should be understood that the total amount of Multimodal PE and LDPE does not necessarily have to equal 100%.

Without being bound to any particular theory, it is presently believed that the low neck-in provided by the inventive compositions, despite the low levels of LDPE present, is due to the molecular architecture of the Multimodal PE component of the composition. Without intending to be bound to any particular theory, it is believed that the high molecular weight, highly branched component of the Multimodal PE leads to the unique balance of processability and extrudability seen in embodiments of the inventive polyethylene extrusion compositions.

3. LDPE

The preferred LDPE for use in the present invention has a density of from 0.916 g/cc to 0.935 g/cc. All individual values and subranges from 0.916 to 0.935 g/cc are included herein and disclosed herein; for example, the density can be from a lower limit of 0.916 g/cc; 0.917 g/cc, or 0.918 g/cc to an upper limit of 0.922 g/cc, 0.927 g/cc or 0.935 g/cc. For example, the LDPE may have a density in the range of from 0.917 g/cc to 0.922 g/cc or in the alternative of from 0.918 g/cc to 0.934 g/cc. The preferred LDPE for use in the present invention has a Melt Index ($I_2$) of from 0.2 g/10 minutes to 10 g/10 minutes. All individual values and subranges from 0.2 g/10 minutes to 10 g/10 minutes are included herein and disclosed herein; for example, the melt index ($I_2$) can be from a lower limit of the melt index ($I_2$) can be from a lower limit of 0.3 g/10 minutes, 0.4 g/10 minutes, or 0.5 g/10 minutes to an upper limit of 1 g/10 minutes, 2 g/10 minutes, 3 g/10 minutes, or 7 g/10 minutes. For example, the LDPE may have a melt index ($I_2$) in the range of 0.3 g/10 minutes to 3 g/10 minutes; or in the alternative, the LDPE may have a melt index ($I_2$) in the range of 0.4 g/10 minutes to 7 g/10 minutes. In some embodiments, the melt index ($I_2$) of the LDPE may be greater than about 0.25 g/10 minutes, or alternatively, more than 0.3 g/10 minutes. In some embodiments, the melt index ($I_2$) of the LDPE may be less than 3 g/10 min, or alternatively, less than about 0.7 g/10 min. While LDPE with a $M_w/M_n$>5.0 as measured by conventional GPC may be used in embodiments of the inventive composition, preferred embodiments of the composition include a LDPE having a $M_w/M_n$ as measured by conventional GPC greater than about 10. The preferred LDPE also may have a $M_w$ (abs)/$M_w$ (GPC) ratio (or GR value) of greater than about 2.0 with Gr values greater than 3 or 3.5 preferably used in some applications. As measured by triple-detector GPC, the $M_w$ (abs)/$M_w$ (RI) is >2.0, more preferably >3.0 and most preferably >3.3. The most preferred LDPE may be made in the autoclave process under single phase conditions designed to impart high levels of long chain branching as described in PCT patent publication WO 2005/023912, the disclosure of which is incorporated herein.

The composition of some embodiments of the present invention may also include LDPE/LDPE blends where one of the LDPE resins has a relatively higher melt index and the other has a lower melt index and is more highly branched. The component with the higher melt index can be obtained from a tubular reactor, and a lower MI, higher branched, component of the blend may be added in a separate extrusion step or using a parallel tubular/autoclave reactor in combination with special methods to control the melt index of each reactor, such as recovery of telomer in the recycle stream or adding fresh ethylene to the autoclave reactor, or any other methods known in the art for controlling the melt index obtained in each reactor. The melt index ($I_2$) of a tubular LDPE for use in the inventive composition is preferably in the range 0.2 g/10 minutes-5.0 g/10 minutes, and more preferably 0.2 g/10 minutes to 1.0 g/10 minutes and most preferably 0.2 g/10 minutes to 0.5 g/10 minutes. Two phase autoclave LDPE resins may also be used, having a melt index ($I_2$) range of 0.2 g/10 minutes-5.0 g/10 minutes and more preferably 0.2 g/10 minutes to 1.0 g/10 minutes and most preferably 0.2 g/10 minutes to 0.5 g/10 minutes.

Suitable high pressure ethylene polymer compositions for use in preparing embodiments of the inventive extrusion composition include low density polyethylene (homopolymer), ethylene copolymerized with at least one α-olefin e.g. butene, and ethylene copolymerized with at least one α,β-ethylenically unsaturated comonomer, e.g., acrylic acid, methacrylic acid, methyl acrylate and vinyl acetate. One suitable technique for preparing useful high pressure ethylene copolymer compositions is described in U.S. Pat. No. 4,599,392, the disclosure of which is incorporated herein by reference.

While both high pressure ethylene homopolymers and copolymers are believed to be useful in the invention, homopolymer polyethylene is generally preferred.

4. Multimodal PE

Multimodal PE, as used herein, includes linear and substantially linear polyethylene resins. The Multimodal PE used in embodiments of the invention may have a density of from 0.860 to 0.965 g/cc. All individual values and subranges from 0.860 to 0.965 g/cc are included herein and disclosed herein; for example, the density can be from a lower limit of 0.860 g/cc, 0.875 g/cc, 0.900 g/cc, 0.905 g/cc, or 0.910 g/cc to an upper limit of 0.965 g/cc, 0.960 g/cc, 0.950, 0.940, or 0.930 g/cc. For example, the LDPE may have a density in the range of from 0.875 g/cc to 0.940 g/cc or in the alternative in the range from 0.905 g/cc to 0.965 g/cc. The Multimodal PE can be made via gas-phase, solution-phase or slurry polymerization or any combination thereof, using any type of single reactor or a combination of two or more reactors in any type of reactor or reactor configuration known in the art. The Multimodal PE utilized in preferred embodiments of the inventive extrusion composition is made in the solution process operating in either parallel or series dual reactor mode.

Multimodal PE made via dual reactor mode comprises a higher melt index ($I_2$) (or low molecular weight) component made in one reactor with a lower melt index ($I_2$) (or high molecular weight) component made in a second reactor, wherein ($\log_{10}$ higher melt index component)–($\log_{10}$ lower melt index component) is greater or equal to 2.0. In the embodiments, the high molecular weight portion contains long chain branching. The low molecular weight component in such a dual reactor Multimodal PE can be made with either a molecular catalyst such as described herein, or a heterogenous catalyst such as a Zeigler/Natta catalyst, whereas the high molecular weight portion may be prepared with a molecular catalyst.

The density of the Multimodal PE is limited only by the theoretical limits, and can be selected as desired for the intended end-use application. The preferred copolymer for the Multimodal PE includes any $C_3$-$C_{20}$ alpha-olefin, although for many applications 1-hexene and 1-octene are preferred. Terminal dienes, including butadiene and higher carbon number dienes can also be used to make the Multimodal PE used in embodiments of the inventive composition. 1,9 decadiene is used in certain preferred embodiments.

Multimodal PE used in preferred embodiments of the inventive compositions comprises a high molecular weight (HMW) component, where the HMW component contains substantial long chain branching.

The preferred melt index ($I_2$) for the Multimodal PE portion of the inventive composition is in the range 5-15 g/10 min. All individual values and subranges from 5 to 15 g/10 min. are included herein and disclosed herein; for example, the density can be from a lower limit of the melt index ($I_2$) can be from a lower limit of 5 g/10 minutes, 6 g/10 minutes, or 7 g/10 minutes to an upper limit of 10 g/10 minutes, 11 g/10 minutes, 13 g/10 minutes, or 15 g/10 minutes. For example, the Multimodal PE may have a melt index ($I_2$) in the range of 5 to 13 g/10 minutes; or in the alternative, the Multimodal PE may have a melt index ($I_2$) in the range of 7 to 11 g/10 minutes. The $I_{10}/I_2$ ratio of the Multimodal PE may be greater than or equal to 7.0. In alternative embodiments, the ratio $I_{10}/I_2$ may be greater than or equal to 8 while in other embodiments the ratio $I_{10}/I_2$ may be greater than 10. Multimodal PE resin includes more than one component, then at least one of such Multimodal PE components preferably is a high molecular weight polymer with substantial long chain branching (the HMW-LCB component) within the constraints of the process and with the following constraints with respect to the totality of the Multimodal PE resin:

a. $M_w(Abs)/M_w(RI) > 1.05$ and $< 1.6$;
b. $M_z(measured)/M_z(calculated) > 1.4$ and $< 3.0$ where $M_z(calculated)$ is calculated from the measured MI according to $M_z(calculated) = 1.5 * 10^{(5.077 - 0.284 * \log 10(I_2))}$;
c. $I_2 > 8.0$ g/10 minutes and $< 15.0$ g/10 minutes; and
d. CDF(RI fraction) $> 0.01$ at a log $10(M_w)$ of 5.5.

The HMW-LCB component of the Multimodal PE preferably comprises from 15% to 35% by weight of the total Multimodal PE resin weight, preferably 20% to 30%, and most preferably 23% to 27%. The HMW-LCB component of the Multimodal PE is manufactured in such a way as to introduce as much LCB as possible in the solution process. This entails running the solution process under conditions which favor the formation of vinyl-terminated macromers (high reaction temperature and/or utilizing a catalyst which favors this mode of termination) and which favors the incorporation of these macromers (low ethylene concentrations and/or utilizing a catalyst which favors incorporation of these macromers). Additionally, utilizing a diene as a comonomer is useful for increasing the branching in this component. Details of a solution process utilizing catalysts which favor long chain branching can be found in WO 2007136506.

Figure 4:
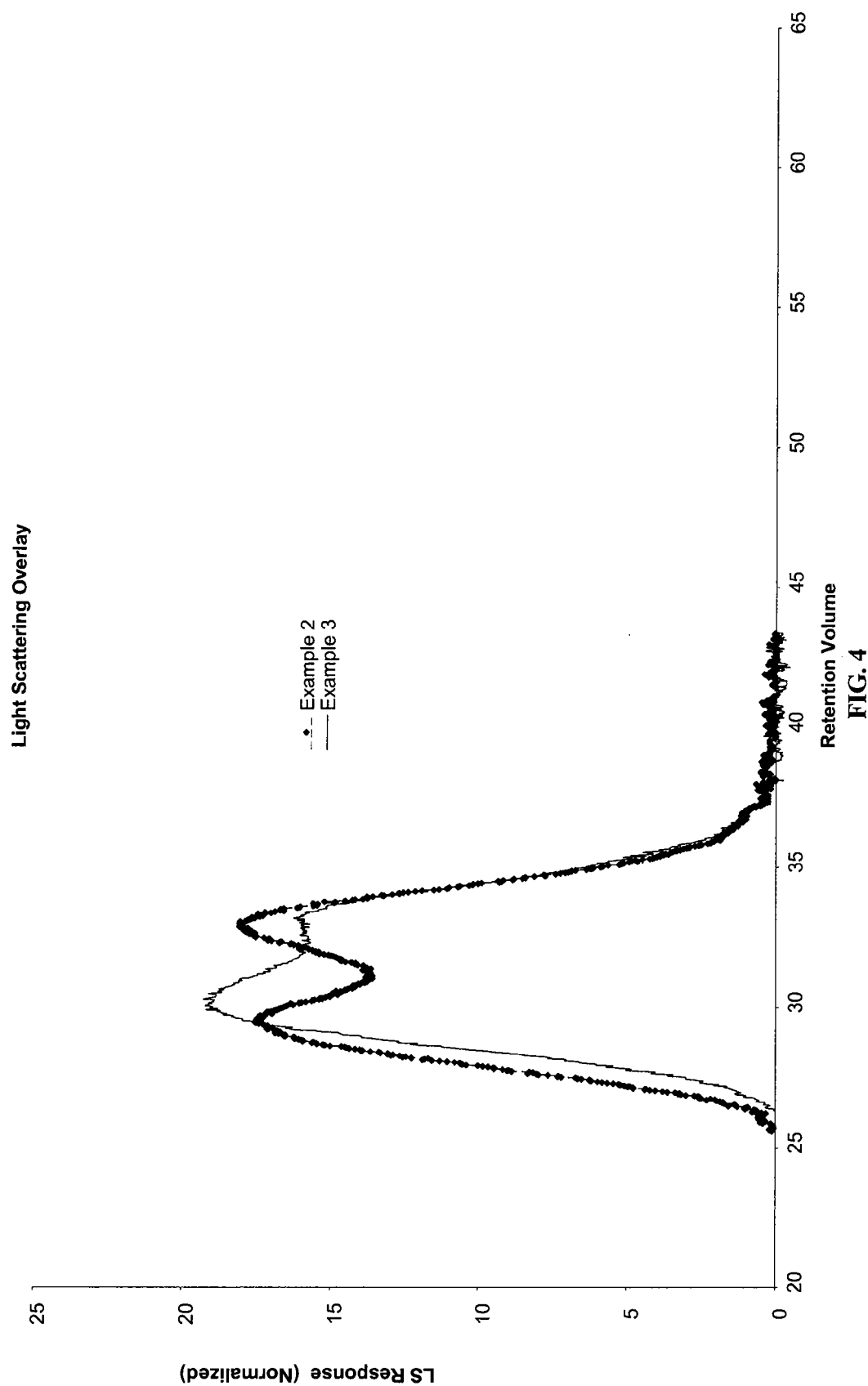
FIG. 4 shows the normalized data of FIG. 3.
Figure 5:
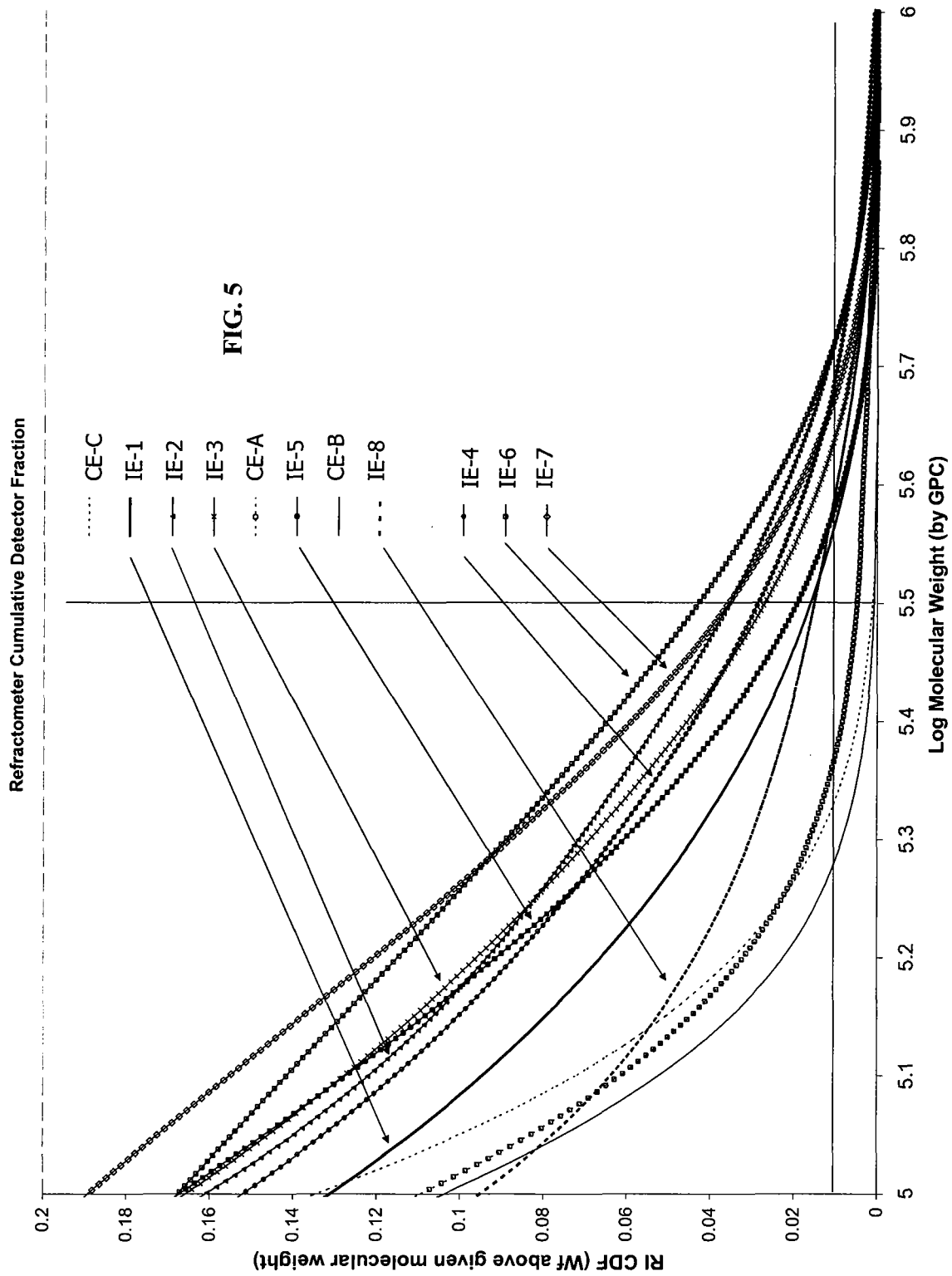
FIG. 5 shows the CDF(RI) plots for inventive and comparative examples discussed herein. In the caption of FIG. 5, the term "CE" is used to refer to comparative examples and the term "IE" is used to refer to inventive examples.

In another preferred aspect of the invention, the Multimodal PE contains only the low and high $I_2$ components and thus contains bi-modal MWD as measured by GPC-LS. FIGS. 3 and 4 illustrate the bi-modal MWD of exemplary Multimodal PE resins of the present invention. Thus, such a composition is preferably made in a two stage solution reactor process. In alternative embodiments of the invention, the Multimodal PE resin may be made in a single reactor with two or more different catalysts, selected to yield widely different molecular weight resins under the same reactor conditions or, in yet another alternative embodiment, made by blending one or more high molecular weight and one or more low molecular weight components. This latter method is not preferred as it removes the advantage of eliminating post-reactor blending. The use of multiple catalysts in one reactor, though possible, is not preferred as the widely differing molecular weights required for the two components are more easily achieved in two separate reactors where the conditions can be controlled to be favorable to the production of the needed molecular weights. In manufacturing situations were ethylene and hydrogen are recycled from the end of the process and fed into the reactor in which the high molecular weight component is being made, it is preferred to remove the hydrogen by some means, including catalytically reacting it with the ethylene after gas separation from the polymer/solvent mixture to produce ethane or prior to separation of the ethylene and hydrogen from the solvent/alpha-olefin mixture.

The high molecular weight polymers containing the LCB are preferably made with a molecular catalyst yielding resin with a maximum MWD of 3.0 and capable of introducing LCB and building high molecular weight such as described in patent applications WO2007/136497, WO2007/136506, WO2007/136495, WO2007/136496, 2007136494, the disclosures of which are incorporated herein. The low molecular weight components may be made with any catalyst known in the art for making linear or substantially linear polyethylene. However a polymer with a MWD<2.2 is preferred. More preferred is a homogeneous comonomer distribution, in the case of ethylene-α-olefin comonomers. All typical and possible levels of comonomer content may be used in various embodiments of the invention and are selected to suit selected reactor conditions and catalyst. Thus, various embodiment of the Multimodal PE utilized in the inventive extrusion compositions exhibit the entire range of densities of polyethylene known in the art. The final density may be obtained by any appropriate combination of density distributions among the components. The design of the composition with respect to density is dictated by the properties required by the end-use application as is well understood in the art.

Without being bound to any particular theory, it is presently believed that the presence of LCB in the low molecular weight component(s) has little effect on the performance of the inventive compositions during extrusion (i.e. motor-load, neck-in, draw-down, instabilities) and on the properties of the extruded product and any level of LCB in the low molecular weight component(s) of the Multimodal PE is within the scope of the invention.

Due to the relatively broad molecular weight distribution of Zeigler-Natta and chromium catalyzed polymers the low molecular component(s) of the inventive compositions are preferably made with a MWD<2.2 using a molecular catalyst, such as a constrained geometry catalyst or other catalyst capable of producing such a polymer, such as described in U.S. Pat. Nos. 5,272,236; 5,278,272; 5,582,923; and 5,733,155, and such as described in patent applications WO 2007136497, WO 2007136506, WO 2007136495, WO 2007136496, and WO 2007136494. This is because the large amount of low molecular weight molecules present when broad molecular weight distribution resins are used causes unacceptable smoke during extrusion and high hexane extractables in the extruded polymer which may be unacceptable, especially in food contact applications. When the polymer is made in the solution process it is preferred that the catalyst used to make the high molecular weight component can generate a high molecular weight product containing high levels of LCB at a reactor temperature >190° C. and at acceptable efficiency. Such catalysts and methods of use described in WO 2007136497, WO 2007136506, WO 2007136495, WO 2007136496, and WO 2007136494.

5. Details of GPC Method Utilized Herein

In order to determine the GPC moments used to characterize the polymer compositions, the following procedure was used:

The chromatographic system consisted of a Waters (Millford, Mass.) 150C high temperature chromatograph equipped with a Precision Detectors (Amherst, Mass.) 2-angle laser light scattering detector Model 2040. The 15-degree angle of the light scattering detector was used for the calculation of molecular weights. Data collection was performed using Viscotek (Houston, Tex.) TriSEC software version 3 and a 4-channel Viscotek Data Manager DM400. The system was equipped with an on-line solvent degas device from Polymer Laboratories (Shropshire, UK).

The carousel compartment was operated at 140° C. and the column compartment was operated at 150° C. The columns used were 7 Polymer Laboratories 20-micron Mixed-A LS columns. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen-sparged. Polyethylene samples were stirred gently at 160° C. for 4 hours. The injection volume used was 200 microliters and the flow rate was 1.0 milliliters/minute.

Calibration of the GPC column set was performed with 18 narrow molecular weight distribution polystyrene standards with molecular weights ranging from 580 to 8,400,000 which were arranged in 5 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)):

$$M_{polyethylene} = A \times (M_{polystyrene})^B$$

where M is the molecular weight, A has a value of 0.41 and B is equal to 1.0. A fourth order polynomial was used to fit the respective polyethylene-equivalent calibration points.

The total plate count of the GPC column set was performed with Eicosane (prepared at 0.04 g in 50 milliliters of TCB and dissolved for 20 minutes with gentle agitation.) The plate count and symmetry were measured on a 200 microliter injection according to the following equations:

PlateCount=5.54*(RV at Peak Maximum/(Peak width at ½ height))^2, where RV is the retention volume in milliliters and the peak width is in milliliters. (1)

Symmetry=(Rear peak width at one tenth height−RV at Peak maximum)/(RV at Peak Maximum−Front peak width at one tenth height) (2)

where RV is the retention volume in milliliters and the peak width is in milliliters.

The Systematic Approach for the determination of multi-detector offsets was done in a manner consistent with that published by Balke, Mourey, et. al (Mourey and Balke, Chromatography Polym. Chpt. 12, (1992)) (Balke, Thitiratsakul, Lew, Cheung, Mourey, Chromatography Polym. Chpt. 13, (1992)), optimizing dual detector log MW results from Dow broad polystyrene 1683 to the narrow standard column calibration results from the narrow standards calibration curve using in-house software. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing $2^{nd}$ virial coefficient effects (concentration effects on molecular weight).

In order to monitor the deviations over time, which may contain an elution component (caused by chromatographic changes) and a flow rate component (caused by pump changes), a late eluting narrow peak is generally used as a "marker peak". A flow rate marker was therefore established based on the air peak mismatch between the degassed chromatographic system solvent and the elution sample on one of the polystyrene cocktail mixtures. This flow rate marker was used to linearly correct the flow rate for all samples by alignment of the air peaks. Any changes in the time of the marker peak are then assumed to be related to a linear shift in both flow rate and chromatographic slope.

To facilitate the highest accuracy of a retention volume (RV) measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (as a measurement of the calibration slope) is calculated as Equation 1. In a high-temperature SEC system, an antioxidant mismatch peak or an air peak (if the mobile phase is sufficiently degassed) can be used as an effective flow marker. The primary features of an effective flow rate marker are as follows: the flow marker should be mono-dispersed. The flow marker should elute close to the total column permeation volume. The flow marker should not interfere with the chromatographic integration window of the sample.

$$FlowRateEffective=FlowRateNominal*FlowMarkerCalibration/FlowMarkerObserved \qquad (3)$$

The preferred column set is of 20 micron particle size and "mixed" porosity to adequately separate the highest molecular weight fractions appropriate to the claims. The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) with approximately equivalent peak heights. There should be adequate separation by demonstrating a trough height between the two peaks less than half of the total LS peak height. The plate count for the chromatographic system (based on eicosane as discussed previously) should be greater than 32,000 and symmetry should be between 1.00 and 1.12.

6. Preparation of the Polymer Extrusion Composition

The preferred blends for making the polymer extrusion compositions of this invention can be prepared by any suitable means known in the art including tumble dry-blending, weigh feeding, solvent blending, melt blending via compound or side-arm extrusion, or the like as well as combinations thereof. The inventive extrusion composition can also be blended with other polymer materials, such as polypropylene, high pressure ethylene copolymers such as ethylvinylacetate (EVA) and ethylene acrylic acid and the like, ethylene-styrene interpolymers, so long as the necessary rheology and molecular architecture as evidenced by multiple detector GPC are maintained. The inventive composition can be used to prepare monolayer or multilayer articles and structures, for example, as a sealant, adhesive or tie layer. The other polymer materials can be blended with the inventive composition to modify processing, film strength, heat seal, or adhesion characteristics as is generally known in the art.

Both the LDPE and the Multimodal PE portions of the preferred composition can be used in a chemically and/or physically modified form to prepare the inventive composition. Such modifications can be accomplished by any known technique such as, for example, by ionomerization and extrusion grafting.

Additives such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, and the like can also be included in the ethylene polymer extrusion composition of the present invention, to the extent that they do not interfere with the high drawdown and substantially reduced neck-in discovered by Applicants. These compositions preferably contain no or only limited amounts of antioxidants as these compounds may interfere with adhesion to the substrate. The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the antistatic characteristics of coatings, profiles and films of this invention and allow, for example, the packaging or making of electronically sensitive goods. Other functional polymers such as maleic anhydride grafted polyethylene may also be added to enhance adhesion, especially to polar substrates. Yet other examples of functionalized polyethylene that may optionally be added to embodiments of the extrusion compositions herein include: copolymers of ethylene and ethylenically unsaturated carboxylic acid such as acrylic acid and methacrylic acid; copolymers of ethylene and esters of carboxylic acid such as vinyl acetate; polyethylene grafted with an unsaturated carboxylic acid or a carboxylic acid anhydride, such as maleic anhydride. Specific examples of such functionalized polyethylene may include, ethylene/vinyl acetate copolymer (EVA), ethylene/acrylic acid copolymer (EAA), ethylene/methacrylic acid copolymer (EMAA), salts therefrom (ionomer), various polyethylene grafted with maleic anhydride (MAH) such as MAH-grafted high pressure low density polyethylene, heterogeneously branched linear ethylene α-olefin interpolymers (which have commonly been referred to as linear low density polyethylene and ultralow density polyethylene), homogeneously branched linear ethylene α-olefin interpolymers, substantially linear ethylene α-olefin interpolymers, and HDPE.

Multilayered constructions comprising the inventive composition can be prepared by any means known including co-extrusion, laminations and the like and combinations thereof. Moreover, compositions of this invention can be employed in co-extrusion operations where a higher drawdown material is used to essentially "carry" one or more lower drawdown materials. In particular the compositions of this invention are well suited to carry a material of lower drawdown.

The ethylene polymer extrusion compositions of this invention, whether of monolayer or multilayered construction, can be used to make extrusion coatings, extrusion profiles and extrusion cast films as is generally known in the art. When the inventive composition is used for coating purposes or in multilayered constructions, substrates or adjacent material layers can be polar or nonpolar including for example, but not limited to, paper products, metals, ceramics, glass and various polymers, particularly other polyolefins, and combinations thereof. For extrusion profiling, various articles can potentially be fabricated including, but not limited to, refrigerator gaskets, wire and cable jacketing, wire coating, medical tubing and water piping, where the physical properties of the composition are suitable for the purpose. Extrusion cast film made from or with the inventive composition can also potentially be used in food packaging and industrial stretch wrap applications.

INVENTIVE AND COMPARATIVE EXAMPLES

The following examples illustrate some of the particular embodiments of the present invention, but the following should not be construed to mean the invention is limited to the particular embodiments shown.

Multimodal PE resins used in Inventive Examples ("Inventive") 1-8 and various non-inventive resins used in Comparative Examples ("Comparative") A-C Table 1 summarizes the $I_2$, $I_{10}$ and $I_{10}/I_2$ ratio of Multimodal PE resins 1-8, made in dual reactor mode with a high molecular weight, long chain branching component, and linear polyethylene resins comparative examples A-C. Table 1 further indicates the catalysts used in preparation of the resins inventive examples 1-8 as well as the nominal polymer produced by the high molecular weight catalyst as a percentage of total polymer weight.

Preparation of Polymers:

Ethylene-octene copolymers were prepared using two continuous stirred tank reactors (CSTR) connected in parallel. Each reactor is hydraulically full and set to operate at steady state conditions. Inventive Examples 1-8 were produced in dual reactors run in parallel, the conditions of which are tabulated in FIGS. 1 and 2. The primary reactor sample is prepared by flowing monomers, solvent, catalyst, cocatalyst, and MMAO to the primary reactor according to the process conditions shown in FIG. 1. The secondary reactor sample is prepared by flowing a separate stream of monomers, solvent, catalyst, cocatalyst, and MMAO according to the process conditions shown in FIG. 2. The two reactor streams are combined after the reactors and mixed, devolatilized and pelletized together Comparitive examples A and B were prepared in single reactor mode using just the primary reactor. The solvent for the polymerization reactions is a hydrocarbon mixture (SBP 100/140) purchased from Shell Chemical Company and purified through beds of 13-X molecular sieves prior to use. Unless specified otherwise, all reagents were handled under anaerobic conditions using standard procedures for the handling of extremely air- and water-sensitive materials. Solvents were degassed and dried over molecular sieves prior to use.

TABLE 1A

| Inventive Ex. 1-8 | Catalyst: HMW/LMW | HMW % (nominal) | $I_2$ (g/10 minutes) | $I_{10}$ (g/10 minutes) | $I_{10}/I_2$ |
|---|---|---|---|---|---|
| 1 | A/B | 25 | 14.3 | 126 | 8.8 |
| 2 | A/C | 25 | 11.7 | 123 | 10.5 |
| 3 | A/C | 35 | 11.2 | 146 | 13.1 |
| 4 | D/C | 25 | 12.7 | 125 | 9.9 |
| 5 | D/C | 35 | 11.4 | 141 | 12.4 |
| 6 | E/C | 25 | 12.1 | 191 | 15.8 |
| 7 | E/C | 35 | 10.7 | 258 | 24.1 |
| 8 | A + DDE/C | 25 | 13.8 | 101 | 7.3 |

TABLE 1B

| Comparative Ex. A-C | Catalyst: HMW/LMW | HMW % (nominal) | $I_2$ (g/10 minutes) | $I_{10}$ (g/10 minutes) | $I_{10}/I_2$ |
|---|---|---|---|---|---|
| A | A | * | 11.2 | 86 | 7.7 |
| B | D | * | 19.9 | 132 | 6.6 |
| C | — | — | 12.0 | 67 | 5.6 |

* Single component resins

For Inventive Ex. 8, 1,9-decadiene (shown as +DDE in Table 1A) was fed at a rate of 11.8 g/hr. The catalysts A, C-E utilized to produce resins Inventive Ex. 1-8 and Comparative Ex. A-B in Tables 1A and 1B are as follows:

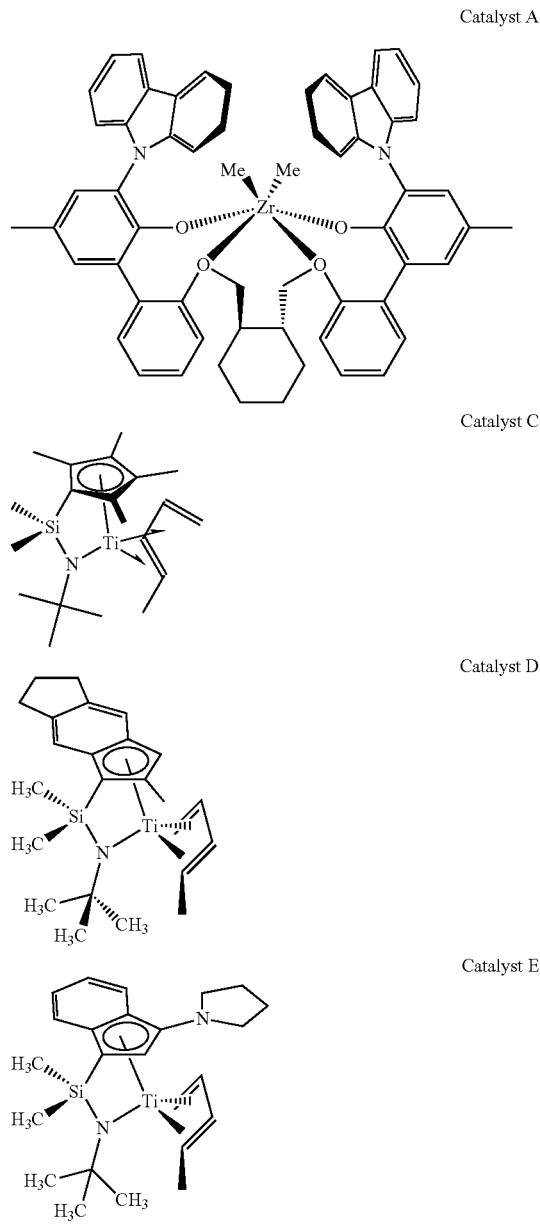

Catalyst A may be made using the process described in WO 2007136497 (and references therein). Catalyst B is a heterogeneous Ziegler-type catalyst prepared substantially according to U.S. Pat. No. 4,612,300 (Ex. P) by sequentially adding to a volume of Isopar E, a slurry of anhydrous magnesium chloride in Isopar E, a solution of $EtAlCl_2$ in hexane, and a solution of $Ti(O-iPr)_4$ in Isopar E, to yield a composition containing a magnesium concentration of 0.17M and a ratio of Mg/Al/Ti of 40/12/3. An aliquot of this composition containing 0.064 mmol of Ti was then treated with a dilute solution of $Et_3Al$ to give an active catalyst with a final Al/Ti ratio of 8/1. Catalyst C may be made using the process described in U.S. Pat. No. 5,512,693. Catalyst D may be made using the process described in WO 9849212. and Catalyst E may be made using the process described in WO 9806727.

The co-catalyst is bis(hydrogenated tallowalkyl)methylammonium tetrakis(pentafluorophenyl)borate which can be prepared using the process described in U.S. Pat. No. 5,919,983. Comparative Ex. C is a commercial homogeneous polyethylene resin available from ExxonMobil.

Melt index ($I_2$) was measured at 190° C. under a load of 2.16 kg according to ASTM D-1238-03. Melt index ($I_{10}$) was measured at 190° C. under a load of 10.0 kg according to ASTM D-1238-03.

Tables 2A and 2B summarize GPC data on the resins of Inventive Ex. 1-8 and Comparative Ex. A-C illustrated in Tables 1A and 1B.

TABLE 2A

| Inventive Ex. 1-8 | $M_n$ | $M_w$ | $M_z$ | MWD | $M_z/M_w$ | $M_z$ (calc) | $M_z/M_z$ (calc) | $M_w$ (abs)/$M_w$ (RI) |
|---|---|---|---|---|---|---|---|---|
| 1 | 6,550 | 49,450 | 143,400 | 7.550 | 2.900 | 84168 | 1.704 | 1.14 |
| 2 | 21,430 | 64,490 | 200,500 | 3.009 | 3.109 | 89004 | 2.253 | 1.16 |
| 3 | 18,560 | 60,360 | 174,700 | 3.252 | 2.894 | 90158 | 1.938 | 1.17 |
| 4 | 16,990 | 60,660 | 199,000 | 3.570 | 3.281 | 87116 | 2.284 | 1.07 |
| 5 | 15,430 | 55,150 | 153,500 | 3.574 | 2.783 | 89796 | 1.709 | 1.16 |
| 6 | 13,470 | 61,270 | 226,700 | 4.549 | 3.700 | 88306 | 2.567 | 1.09 |
| 7 | 6,370 | 54,640 | 227,300 | 8.578 | 4.160 | 91358 | 2.488 | 1.06 |
| 8 | 9,370 | 47,770 | 138,700 | 5.098 | 2.903 | 84990 | 1.632 | 1.51 |

TABLE 2B

| Comparative Ex. A-C | $M_n$ | $M_w$ | $M_z$ | MWD | $M_z/M_w$ | $M_z$ (calc) | $M_z/M_z$ (calc) | $M_w$ (abs)/$M_w$ (RI) |
|---|---|---|---|---|---|---|---|---|
| A | 31,020 | 51,130 | 105,500 | 1.648 | 2.063 | 90204 | 1.170 | 1.23 |
| B | 21,680 | 48,590 | 80,700 | 2.241 | 1.661 | 76620 | 1.053 | 1.13 |
| C | 20,740 | 52,320 | 93,800 | 2.52 | 1.79 | 88490 | 1.06 | 1.06 |

Tables 3A-3B summarize certain key parameters for the inventive example and comparative example resins in Tables 1A-1B.

TABLE 3A

| Inventive Ex. 1-8 | F = $M_w$ (Abs)/$M_w$ (RI) | Z = $M_z/M_z$ (calc) | R = CDF (RI) fraction at log10 ($M_w$) = 5.5 | $I_2$ (g/10 minutes) |
|---|---|---|---|---|
| 1 | 1.14 | 1.704 | 0.0158 | 14.3 |
| 2 | 1.16 | 2.253 | 0.0361 | 11.7 |
| 3 | 1.17 | 1.938 | 0.0266 | 11.2 |
| 4 | 1.07 | 2.284 | 0.0282 | 12.7 |
| 5 | 1.16 | 1.709 | 0.0188 | 11.4 |
| 6 | 1.09 | 2.567 | 0.0426 | 12.1 |
| 7 | 1.06 | 2.488 | 0.0361 | 10.7 |
| 8 | 1.51 | 1.632 | 0.0152 | 13.8 |

TABLE 3B

| Comparative Ex. A-C | F = $M_w$ (Abs)/$M_w$ (RI) | Z = $M_z/M_z$ (calc) | R = CDF (RI) fraction at log10 ($M_w$) = 5.5 | $I_2$ (g/10 minutes) |
|---|---|---|---|---|
| A | 1.23 | 1.170 | 0.0048 | 11.2 |
| B | 1.13 | 1.053 | 0.0008 | 11.0 |
| C | 1.06 | 1.06 | 0.0011 | 12.0 |

Each of the Multimodal PE resin Inventive Ex. 1-8 and resins Comparative Ex. A-C shown in Tables 1A-1B were used to prepare extrusion composition blends. Each of the polyethylene Examples and Comparative Examples shown in Tables 1A-1B were blended with 4 wt % LDPE. The LDPE resin used in the examples and comparative examples of Extrusion Compositions shown in Tables 4A-4B is described, including a process for making the LDPE resin, in PCT patent publication WO 2005/023912. More specifically, the LDPE resin used is available from The Dow Chemical Company, as LDPE 662i, (having an $I_2$ of 0.45 g/10 minutes, density of 0.919 g/cc, and $M_w$(abs)/$M_w$(GPC) of 3.5). Each of Extrusion Composition Inventive Examples 1-8 and Extrusion Composition Comparative Examples A-C in Tables 4A-4B and 5A-5B were produced using the corresponding numbered Multimodal PE Inventive Ex. 1-8 and resins Comparative Ex A-C illustrated in Tables 1A-1B.

Table 4A-4B provide the melt indexes ($I_2$) of the extrusion composition blends following dry blending but prior to extrusion. Except for blend Comparative Ex. C (which was both calculated and measured), $I_2$ was calculated using the model:

$$\log_{10}(MI) = f\_LDPE * \log_{10}(I_2(LDPE)) + f\_Linear * \log_{10}(I_2(Linear))$$

MI=10^log($I_2$), where f_LDPE is the weight fraction of LDPE and f_Linear is the weight fraction of the linear resin, and where f_LDPE+f_Linear=1.0.

TABLE 4A

| Inventive Ex. 1-8 | $I_2$ (g/10 minutes) (calculated) |
|---|---|
| 1 | 12.5 |
| 2 | 10.3 |
| 3 | 9.85 |
| 4 | 11.1 |
| 5 | 10.0 |
| 6 | 10.6 |
| 7 | 9.43 |
| 8 | 12.0 |

TABLE 4B

| Comparative Ex. A-C | $I_2$ (g/10 minutes) (calculated) – $I_2$ (gf/10 minutes) (measured) |
|---|---|
| A | 9.85 |
| B | 17.1 |
| C | 10.5-10.5 |

Tables 5A-5B summarize the processing properties of Extrusion Composition Inventive Ex. 1-8 and Extrusion Compositions Comparative Ex. A-C wherein the Amps, Melt T (melt temperature in ° C., HP (horsepower) and Press (pressure) are coater operation parameters and wherein DD is drawdown in ft/min).

TABLE 5A

| Extrusion Composition Inventive | Neck-in (inches) at | | | | | Melt T | Press |
|---|---|---|---|---|---|---|---|
| Ex. 1-8 | 440 fpm | 880 fpm | DD | HP | Amps | (° C.) | (psi) |
| 1 | 4.375 | 4.000 | 1500+ | 35 | 126 | 313 | 1135 |
| 2 | 3.625 | 3.500 | 1250 | 20 | 75 | 319 | 863 |
| 3 | 3.750 | 3.750 | 1275 | 22 | 78 | 318 | 766 |
| 4 | 3.500 | 3.375 | 1500+ | 28 | 101 | 315 | 1105 |
| 5 | 4.000 | 4.125 | 1500+ | 15 | 55 | 320 | 588 |
| 6 | 3.625 | 3.625 | 1500+ | 16 | 58 | 317 | 695 |
| 7 | 4.250 | 4.250 | 1500+ | 17 | 62 | 316 | 655 |
| 8 | 3.750 | 3.750 | 1500+ | 26 | 94 | 316 | 937 |

TABLE 5B

| Extrusion Composition Comparative | Neck-in (inches) at | | | | | Melt T | Press |
|---|---|---|---|---|---|---|---|
| Ex. A-C | 440 fpm | 880 fpm | DD | HP s | Amp | (° C.) | (psi) |
| A | 4.250 | 4.000 | 1500+ | 34 | 121 | 317 | 1227 |
| B | 4.500 | 4.125 | 1500+ | 30 | 111 | 316 | 994 |
| C | 6.375 | 5.875 | 1500 | 40 | 143 | 323 | 1803 |

We claim:

1. An extrusion composition comprising from 80% to 98% a multimodal polyethylene and 2% to 20% LDPE wherein the multimodal polyethylene comprises a high molecular weight component which comprises long chain branching wherein the multimodal polyethylene resin is characterized by:
   a. $M_w(abs)/M_w(RI) > 1.05$ and $<1.6$;
   h. $M_z(measured)/M_z(calc) > 1.4$ and $<3.0$ where $M_z(calc)$ is calculated from the measured $I_2$ according to $M_z(calc) = 1.5*10^{(5.077-0.284*log\,(10(I_2))}$;
   c. $I_2 > 9.0$ g/10 minutes and $<15.0$ g/10 minutes;
   d. CDF (RI fraction) $>0.01$ at a log $10(M_w)$ of 5.5; and
   e. density in the range 0.860-0.965 g/ee; and
   the LDPE is characterized by having a $I_2$ less than 10 g/10 minutes and greater than 0.2 g/10 minutes, and a $M_w(abs)/M_w(RI) > 2.0$.

2. The extrusion composition of claim 1 wherein the composition comprises from 91% to 97% multimodal polyethylene and 3% to 9% LDPE and further wherein the multimodal polyethylene comprises a high molecular weight component which comprises long chain branching wherein the multimodal polyethylene resin is characterized by:
   a. $M_w(abs)/M_w(RI) > 1:10$ and $<1.20$;
   h. $M_z(measured)/M_z(calc) > 1.5$ and $<2.5$;
   c. $I_2 > 9.0$ g/10 minutes and $<12.0$ g/10 minutes;
   d. CDF (RI fraction) $>0.02$ at a log $10(M_w)$ of 5.5; and
   e. MWD$>3.0$ and $<3.5$; and
   the LDPE is characterized by having a $I_2$ less than 1.0 g/10 minutes and greater than 0.3 g/10 minutes, and the $M_w(abs)/M_w(RI)$ is $>3.2$.

3. An article comprising at least one layer of an ethylene polymer extrusion composition, wherein the extrusion composition comprises from 80% to 98% multimodal polyethylene and 2% to 20% LDPE wherein the multimodal polyethylene comprises a high molecular weight component which comprises long chain branching wherein the multimodal polyethylene resin is characterized by:
   a. $M_w(abs)/M_w(RI) > 1.05$ and $<1.6$;
   b. $M_z(measured)/M_z(calc) > 1.4$ and $<3.0$ where $M_z(calc)$ is calculated from the measured $I_2$ according to $M_z(calc) = 1.5*10^{(5.077-0.284*log\,(10(I_2))}$;
   c. $I_2 > 9.0$ g/10 minutes and $<15.0$ g/10 minutes;
   d. CDF (RI fraction) $>0.01$ at a log $10(M_w)$ of 5.5; and
   density in the range 0.860-0.965 g/cc; and
   the LDPE is characterized by having a $I_2$ less than 10 g/10 minutes and greater than 0.2 g/10 minutes, and a $M_w(abs)/M_w(RI) > 2.0$.

4. The article of claim 3, wherein the article is in the form of an extrusion profile, an extrusion coating onto a substrate or an extrusion cast film.

5. The article of claim 4 wherein the article is an extrusion coating onto a substrate and the substrate is a woven or non-woven fabric.

6. The article of claim 3, wherein the at least one layer of an ethylene polymer composition is a sealant layer, adhesive layer, abuse resistance layer, or release surface.

7. The article of claim 6 wherein the article is a sealant layer and wherein the density of the multimodal polyethylene is $<0.915$ g/cc.

8. The article of claim 6 wherein the article is a release surface wherein density of the multimodal polyethylene is $>0.940$ g/cc.

* * * * *